United States Patent
Sander et al.

(10) Patent No.: US 6,853,494 B2
(45) Date of Patent: Feb. 8, 2005

(54) ZOOM SYSTEM

(75) Inventors: Ulrich Sander, Rebstein (CH); Thomas Pozivil, AU/SG (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 26 days.

(21) Appl. No.: 10/692,571

(22) Filed: Oct. 24, 2003

(65) Prior Publication Data
US 2004/0114223 A1 Jun. 17, 2004

(30) Foreign Application Priority Data
Oct. 25, 2002 (DE) ......................... 102 49 702

(51) Int. Cl.⁷ ..................... G02B 15/14; G02B 21/00
(52) U.S. Cl. ................. 359/676; 359/744; 359/368
(58) Field of Search ................ 359/362, 368–380, 359/676, 686, 744–783

(56) References Cited

U.S. PATENT DOCUMENTS

| 3,731,990 | A | * | 5/1973 | Van Orden | ............... 359/732 |
| 4,015,897 | A | * | 4/1977 | Konoma et al. | ............ 359/740 |
| 4,632,520 | A | * | 12/1986 | Yamakawa | ................ 359/732 |
| 5,708,532 | A | * | 1/1998 | Wartmann | ................ 359/663 |

OTHER PUBLICATIONS

M690 (Leica brochure: Ophthalmologie [Ophthalmology]) M1–602–0de–1.94–SCH, Jan. 1994 printing.

* cited by examiner

Primary Examiner—Thong Q Nguyen
(74) Attorney, Agent, or Firm—Hodgson Russ LLP

(57) ABSTRACT

The invention concerns a zoom system, having various materials (glass types) and variable air spaces, for example for a surgical (stereo)microscope, constructed from four symmetrically arranged lens groups (2 through 5), each two lens groups (2, 5; 3, 4) being arranged identically and in mirror-image fashion with respect to one another. As a result of the special selection of glass types having anomalous partial dispersion, and the specific design features, a high zoom factor is achieved with a short overall length, as well as good correction of the secondary spectrum, astigmatism, and field curvature.

10 Claims, 2 Drawing Sheets

ZOOM SYSTEM

CROSS REFERENCE TO RELATED APPLICATIONS

This application claims priority of the German patent application 102 49 702.8 filed Oct. 25, 2002 which is incorporated by reference herein.

FIELD OF THE INVENTION

The invention concerns a zoom system, for example for a surgical microscope.

BACKGROUND OF THE INVENTION

Zoom systems, i.e. variable magnification systems, are used today in almost every surgical microscope. One important representative thereof is the M690 (Leica brochure: Ophthalmologie [Ophthalmology] M1-602-0de-1.94-SCH, January 1994 printing).

The zoom system in this known microscope comprises an even number of optical elements. It has a four-element configuration and is constructed symmetrically. Each two lens groups are identical, and the groups are arranged in mirror-image fashion with respect to each other. The two outer lens groups are arranged immovably, the two inner groups movably. The two outer lens groups have positive refractive power, the two inner ones negative refractive power. Both focusing and a change in magnification are possible therewith.

The inventor has recognized that the systems existing today are capable of being improved in terms of chromatic aberrations, in particular those of the secondary system, and with regard to curvature of field and astigmatism. It is likewise desirable to keep the overall length short without having to sacrifice a high zoom factor.

SUMMARY OF THE INVENTION

Proceeding from this recognition, it is thus the object of the invention to improve the previously occurring chromatic aberrations, especially those of the second spectrum, in the context of apochromaticity; and to eliminate the disadvantages listed above and keep the overall length of the zoom short.

This object is achieved by the use of materials (glass types) having special optical properties as well as particular design features, such as the geometry of the boundary surfaces and of the air spaces. A zoom system of the present invention comprises a first lens group having lenses (11) and (12), a second lens group having lenses (13) and (14), a third lens group having lenses (15) and (16), and a fourth lens group having lenses (17) and (18) arranged in sequence and aligned along an optical axis, the first and fourth lens groups being mirror images of one another, the second and third lens groups being mirror images of one another, a first air gap between the first and second lens groups, a second air gap between the second and third lens groups, and a third air gap between the third and fourth lens groups, each of the second and third lens groups being movable along the optical axis thereby enabling variation of the first, second, and third air gaps, wherein the lenses (11 through 18) and air gaps have the following geometric and optical properties:

| Boundary surface or Medium | Radius $r_1$ (mm) | Thickness or air gap $d_1$ (mm) [air gaps given at first limit, intermediate position, and second limit] | $n_d$ | $v_d$ |
|---|---|---|---|---|
| S1 | 29.48 | | | |
| Lens 11 | | 2.0 | 1.72342 | 37.95 |
| S2 | 18.62 | | | |
| Lens 12 | | 3.5 | 1.49700 | 81.63 |
| S3 | −176.25 | | | |
| Air Gap 1 | | 31.65 . . . 23.18 . . . 2.00 | | |
| S4 | −123.57 | | | |
| Lens 13 | | 2.0 | 1.57956 | 53.87 |
| S5 | 12.93 | | | |
| Lens 14 | | 3.0 | 1.76182 | 26.52 |
| S6 | 19.69 | | | |
| Air Gap 2 | | 14.70 . . . 2.64 . . . 15.35 | | |
| S7 | −19.69 | | | |
| Lens 15 | | 3.0 | 1.76182 | 26.52 |
| S8 | −12.93 | | | |
| Lens 16 | | 2.0 | 1.57956 | 53.87 |
| S9 | 123.57 | | | |
| Air Gap 3 | | 2.65 . . . 23.18 . . . 31.65 | | |
| S10 | 176.25 | | | |
| Lens 17 | | 3.5 | 1.49700 | 81.63 |
| S11 | −18.62 | | | |
| Lens 18 | | 2.0 | 1.72342 | 37.95 |
| S12 | −29.48 | | | |

The present invention also covers a microscope, preferably a stereomicroscope, incorporating the zoom system. The microscope includes an eyepiece, wherein the field curvature of the zoom system is preferably adapted to the field curvature of the eyepiece.

BRIEF DESCRIPTION OF THE DRAWINGS

The drawings schematically depict a zoom system according to the present invention for a surgical microscope, wherein.

DETAILED DESCRIPTION OF THE INVENTION

Figure 1:
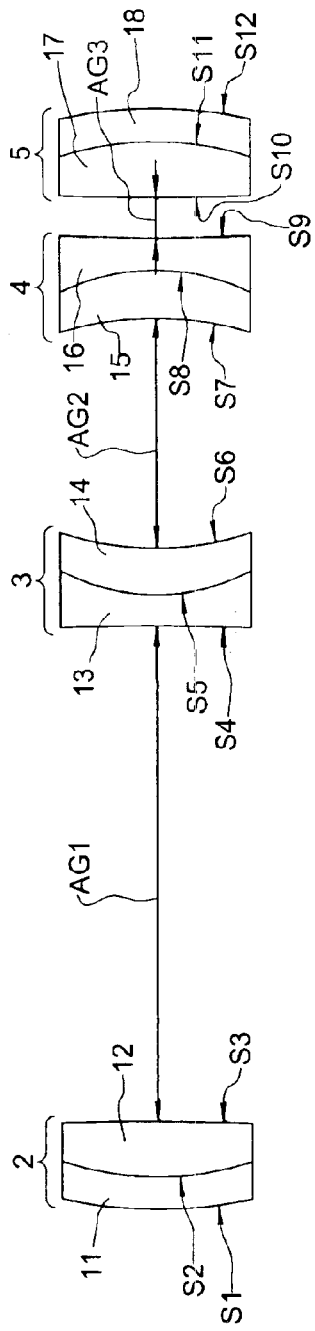
FIG. 1 is a schematic diagram of a zoom system formed in accordance with an embodiment of the present invention, wherein movable lens groups of the zoom system are shown at a first limit position.
Figure 2:
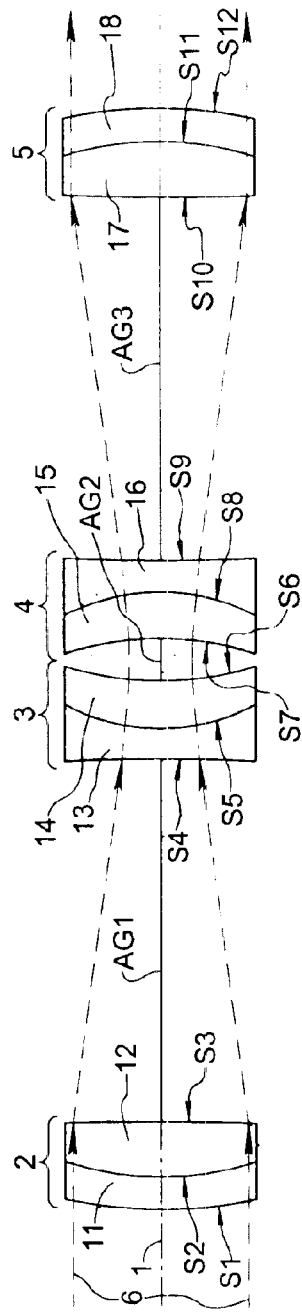
FIG. 2 is a schematic diagram of the zoom system shown in FIG. 1, wherein the movable lens groups are shown at an intermediate position giving 1:1 magnification, and an optical axis and light beam are also shown.
Figure 3:
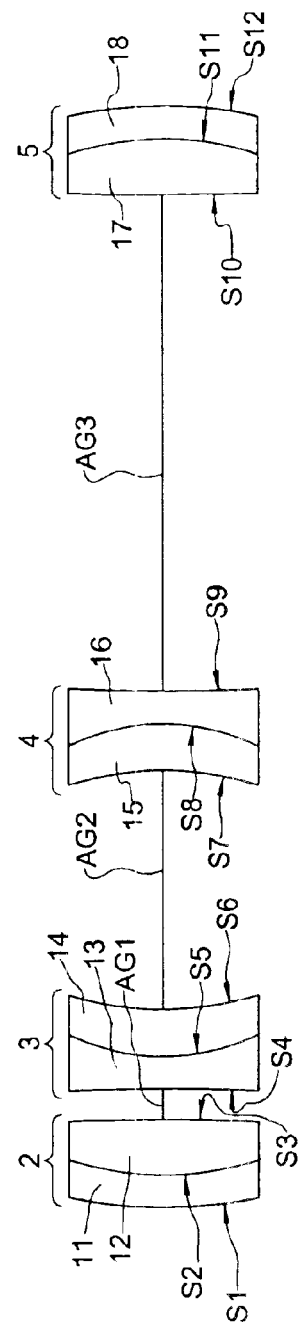
FIG. 3 is a schematic diagram of the zoom system shown in FIG. 1, wherein movable lens groups of the zoom system are shown at a second limit position.

Reference is made to FIGS. 1–3. Light beam 6 (shown in FIG. 2 only) proceeding from a viewed specimen (not depicted) is directed, at a first lens group 2 which comprises two lenses 11 and 12 and has positive refractive power, onto a lens group 3 that comprises two lenses 13 and 14 and has negative refractive power. From lens group 3, light beam 6 is conveyed onto a lens group 4 that comprises two lenses 15 and 16, and further directed onto a lens group 5 that comprises two lenses 17 and 18. Lens groups 2, 3, 4, and 5 are embodied as cemented elements each having two individual lenses. Lens groups 2 and 5 on the one hand, and 3 and 4 on the other hand, are respectively identical to one another and arranged in mirror-image fashion. Lens groups 2 and 5 are arranged immovably; lens groups 3 and 4 are mounted movably. The axial displaceability of lens groups 3 and 4 along an optical axis 1 of the zoom system makes possible focusing onto the specimen and modification of the focal length.

Optical glass can be characterized by $n_d$, $v_d$, $P_{g,F}$ and $P_{C,t}$, where $n_d$ designates the refractive index, $$v_d = \frac{n_d - 1}{n_F - n_C}$$

the Abbé number, $$P_{g,F} = \frac{n_g - n_F}{n_F - n_C}$$

the relative partial dispersion for wavelengths g and F, and $$P_{C,t} = \frac{(n_C - n_t)}{n_F - n_C}$$

the relative partial dispersion for wavelengths C and t. For most glasses ("standard glasses"), the following linear equations ("standard straight lines") are approximately valid:

$$P_{n\ g,F} = 0.6438 - 0.001628 \cdot v_d,$$

$$P_{n\ C,t} = 0.5450 + 0.004743 \cdot v_d.$$

The glasses used in this invention do not obey this linear equation. The deviations of the relative partial dispersions from the standard straight lines are $$|P_{g,F} - P_{n\ g,F}| > 0.001$$

and/or $$|P_{C,t} - P_{n\ C,t}| > 0.002$$

The glasses used are listed in Table 1.

TABLE 1

| Material | $n_d$ | $v_d$ | Delta $P_{g,F}$ | Delta $P_{C,t}$ |
|---|---|---|---|---|
| A | 1.72342 | 37.95 | 0.0035 | 0.0023 |
| B | 1.49700 | 81.63 | 0.0319 | −0.1133 |
| C | 1.57956 | 53.87 | −0.0012 | −0.0053 |
| D | 1.76182 | 26.52 | 0.0150 | 0.0046 |

Figure 4:
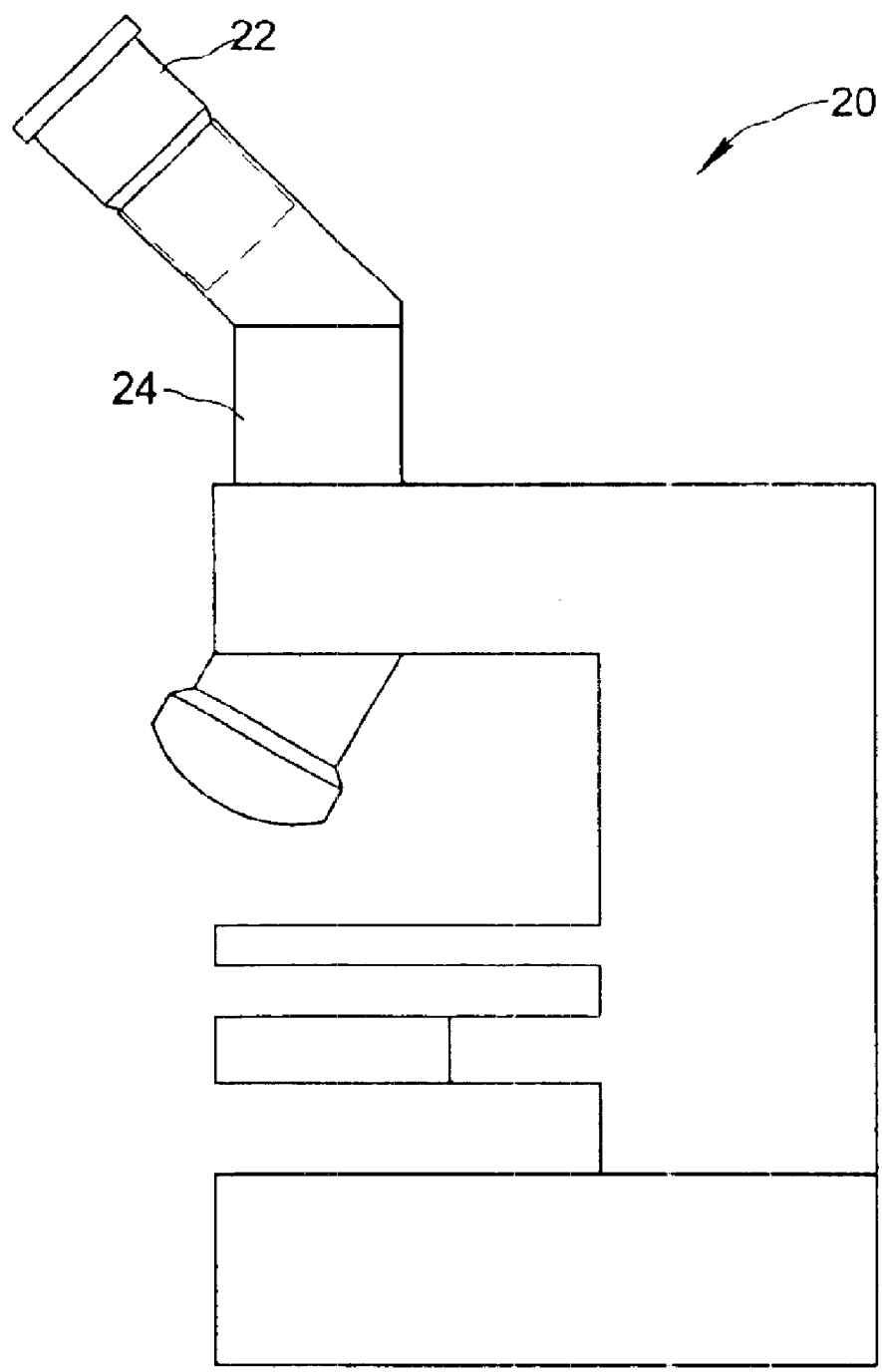
FIG. 4 is a schematic representation of a stereomicroscope incorporating the zoom system shown in FIG. 1.

FIG. 4 depicts a two-channel stereomicroscope 20 comprising an eyepiece 22 and a zoom system 24 configured as described above. As a result of the special choice of materials, and the geometries of the boundary surfaces (S1 through S12) and air or gas spaces (air gaps) (AG1 through AG3) described in Table 2 below, chromatic aberrations (especially those of the secondary spectrum) are reduced, and an improvement in the context of apochromaticity, as well as a reduction in astigmatism and flatness, are achieved. The field curvature of the new zoom system 24 according to the present invention thus corresponds approximately to the field curvature of the eyepiece 22.

TABLE 2

| Boundary surface or Medium | Radius $r_i$ (mm) | Thickness or air space $d_i$ (mm) | Material | $n_d$ | $v_d$ |
|---|---|---|---|---|---|
| S1 | 29.48 | | | | |
| Lens 11 | | 2.0 | A | 1.72342 | 37.95 |
| S2 | 18.62 | | | | |
| Lens 12 | | 3.5 | B | 1.49700 | 81.63 |
| S3 | −176.25 | | | | |
| Air Gap 1 | | 31.65 . . . 23.18 . . . 2.00 | Air | | |
| S4 | −123.57 | | | | |
| Lens 13 | | 2.0 | C | 1.57956 | 53.87 |
| S5 | 12.93 | | | | |
| Lens 14 | | 3.0 | D | 1.76182 | 26.52 |
| S6 | 19.69 | | | | |
| Air Gap 2 | | 14.70 . . . 2.64 . . . 15.35 | Air | | |
| S7 | −19.69 | | | | |
| Lens 15 | | 3.0 | D | 1.76182 | 26.52 |
| S8 | −12.93 | | | | |
| Lens 16 | | 2.0 | C | 1.57956 | 53.87 |
| S9 | 123.57 | | | | |
| Air Gap 3 | | 2.65 . . . 23.18 . . . 31.65 | Air | | |
| S10 | 176.25 | | | | |
| Lens 17 | | 3.5 | B | 1.49700 | 81.63 |
| S11 | −18.62 | | | | |
| Lens 18 | | 2.0 | A | 1.72342 | 37.95 |
| S12 | −29.48 | | | | |

In contrast to conventional systems, the design features and special selection of the glass types for the lenses of the zoom system according to the present invention result in a short overall length of 70 mm, despite the very high zoom factor of 6X. Selection of adjacent glass types and correspondingly corrected air spaces makes possible, with fundamentally the same configuration, zoom factors between 5X and 8X with overall lengths between approximately 60 mm and approximately 100 mm.

The symmetrical arrangement of each two identical lens groups makes possible, as is known per se, a small number of different lens groups and individual lenses. This is true in particular for a stereomicroscope, in which the number of lens groups is doubled because two optical channels are used parallel to one another.

The zoom system described above can be utilized both in a stereomicroscope having one main objective and two partial beam paths, and in single-channel or stereoscopic single-channel microscope systems. The lens diameter of the zoom system can preferably correspond to the lens diameter of the main objective.

Parts List

1 Optical axis of zoom system
2 Lens group 1
3 Lens group 2
4 Lens group 3
5 Lens group 4
6 Light beam
11 Lens (material A)
12 Lens (material B)
13 Lens (material C)
14 Lens (material D)
15 Lens (material D)
16 Lens (material C)
17 Lens (material B)
18 Lens (material A)
20 Microsope
22 Eyepiece
23 Zoom system

What is claimed is:

1. A zoom system for a microscope, the zoom system comprising a first lens group having lenses (11) and (12), a second lens group having lenses (13) and (14), a third lens group having lenses (15) and (16), and a fourth lens group having lenses (17) and (18) arranged in sequence and aligned along an optical axis, the first and fourth lens groups being mirror images of one another, the second and third lens groups being mirror images of one another, a first air gap between the first and second lens groups, a second air gap between the second and third lens groups, and a third air gap between the third and fourth lens groups, each of the second and third lens groups being movable along the optical axis thereby enabling variation of the first, second, and third air gaps, wherein the lenses (11 through 18) and air gaps have the following geometric and optical properties:

| Boundary surface or Medium | Radius $r_1$ (mm) | Thickness or air gap $d_1$ (mm) [air gaps given at first limit, intermediate position, and second limit] | $n_d$ | $v_d$ |
|---|---|---|---|---|
| S1 | 29.48 | | | |
| Lens 11 | | 2.0 | 1.72342 | 37.95 |
| S2 | 18.62 | | | |
| Lens 12 | | 3.5 | 1.49700 | 81.63 |
| S3 | −176.25 | | | |
| Air Gap 1 | | 31.65 . . . 23.18 . . . 2.00 | | |
| S4 | −123.57 | | | |
| Lens 13 | | 2.0 | 1.57956 | 53.87 |
| S5 | 12.93 | | | |
| Lens 14 | | 3.0 | 1.76182 | 26.52 |
| S6 | 19.69 | | | |
| Air Gap 2 | | 14.70 . . . 2.64 . . . 15.35 | | |
| S7 | −19.69 | | | |
| Lens 15 | | 3.0 | 1.76182 | 26.52 |
| S8 | −12.93 | | | |
| Lens 16 | | 2.0 | 1.57956 | 53.87 |
| S9 | 123.57 | | | |
| Air Gap 3 | | 2.65 . . . 23.18 . . . 31.65 | | |
| S10 | 176.25 | | | |
| Lens 17 | | 3.5 | 1.49700 | 81.63 |
| S11 | −18.62 | | | |
| Lens 18 | | 2.0 | 1.72342 | 37.95 |
| S12 | −29.48. | | | |

2. The zoom system as defined in claim 1, wherein the lenses are formed of optical materials having deviations of the relative partial dispersions from the standard straight lines described by $$|P_{g,F} - P_{n\,g,F}| > 0.001$$

and $$|P_{C,t} - P_{n\,C,t}| > 0.002.$$

3. The zoom system as defined in claim 2, wherein lenses (11) and (18) are formed of a material (A), lenses (12) and (17) are formed of a material (B), lenses (13) and (16) are formed of a material (C), and lenses (14) and (15) are formed of a material (D), wherein materials (A), (B), (C), and (D) are described by the following table:

| Material | $n_d$ | $v_d$ | Delta $P_{g,F}$ (deviations of the relative partial dispersions) | Delta $P_{C,t}$ (deviations of the relative partial dispersions) |
|---|---|---|---|---|
| A | 1.72342 | 37.95 | 0.0035 | 0.0023 |
| B | 1.49700 | 81.63 | 0.0319 | −0.1133 |
| C | 1.57956 | 53.87 | −0.0012 | −0.0053 |
| D | 1.76182 | 26.52 | 0.0150 | 0.0046. |

4. The zoom system as defined in claim 1, wherein the lenses are fabricated of materials chosen for a correction of the secondary spectrum.

5. The zoom system as defined in claim 1, wherein the lenses are fabricated of materials chosen for a correction of astigmatism.

6. The zoom system as defined in claim 1, wherein the lenses are fabricated of materials chosen for a correction of field curvature.

7. A microscope having a zoom system as defined in claim 1 and an eyepiece.

8. The microscope as defined in claim 7, wherein the field curvature of the zoom system is adapted to the field curvature of the eyepiece.

9. The microscope as defined in claim 8, wherein the microscope is a stereomicroscope.

10. The microscope as defined in claim 9, wherein the stereomicroscope is a two-channel stereomicroscope.

* * * * *